G. HAMEL.
Improvement in Harvesters.
No. 130,993.    Patented Sep. 3, 1872.
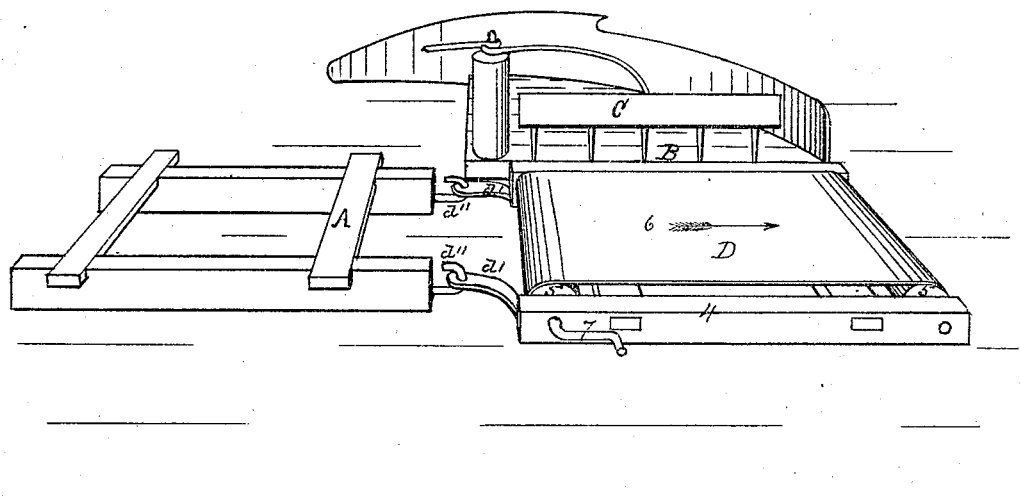
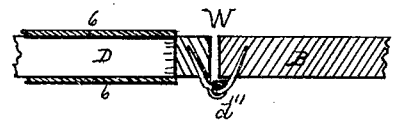
WITNESSES    INVENTOR:

UNITED STATES PATENT OFFICE.

GEORGE HAMEL, OF JENKINTOWN, PENNSYLVANIA.

IMPROVEMENT IN HARVESTERS.

Specification forming part of Letters Patent No. 130,993, dated September 3, 1872.

Specification describing certain Improvements in the Attachment of Swathers to Harvesters, invented by GEORGE HAMEL, of Jenkintown, in the county of Montgomery and State of Pennsylvania.

My invention relates to the arrangement of a surface moving table or traveling canvas, beside the platform upon which the grain falls as it is cut, in relation to the rake or rakes which sweep the cut grain from the platform, in such a manner that as the said rake or rakes clear the cut grain from said platform, as heretofore, the moving table or traveling canvas will carry the said grain toward the rear end of the same, and finally deliver it upon the ground in a continuous swath in rear of the said traveling canvas; the object of my invention being the delivery of the grain in a continuous, regular, and uniform swath, with the stems or stalks parallel with each other, and at right angles, or nearly so, to the line of the swath, and also with the heads of the said stalks all on the same side of the swath, thus greatly facilitating the subsequent operation of raking and binding.

The drawing is a sectional representation of the main portion of the carrying-frame of a grain-harvester and the platform and rake thereof, without the cutter-bar and carrying-wheels, embodying my invention.

A, the main carrying-frame of the harvester, may be constructed and supported upon wheels, in connection with the cutter-bar, cutters, and operating gearing, in any of the usual modes. The reaping-platform B and its rake C are intended to be constructed to operate together, so as to cause the cut grain which falls upon the platform to be raked off as it falls by the action of the rake or rakes toward the swath-ground, in the usual manner for throwing off the grain in bunches; but, instead of throwing the grain off in bunches upon the ground, I provide a surface-moving table or swather, D, which is articulated by means of links $d'$ $d'$ and hooks $d''$ $d''$, or their equivalents, to the rear end of the carrying-frame A, and also by a link-joint, $d'''$, or its equivalent, which will keep the swather D close along side of the platform B, and directly in rear of the frame A, and at the same time allow the swather to move up and down by turning on the links, so as to accommodate itself, if necessary, to any of the common unevennesses of the ground. (See Diagram W.) The swather D consists of a rectangular flat frame, 4, having a roller, 5, at its front and also at its rear end, over and under which an apron, 6, of canvas or leather is stretched, so that as either of the said rollers is caused to rotate the said apron will be moved along longitudinally over and under the rollers. Motion is intended to be given to the front roller by means of a crank, 7, or cog-gear, in connection with the supporting-wheel (not shown) of that part of the swather in such a manner that the upper portion of the apron 6 will be moved in the direction of the arrow shown in the drawing.

In the operation of my invention the cut grain, falling rearward upon the platform B, is immediately swept off, over the side next to the swath, by the rakes C, in the usual manner; but, instead of falling upon the ground in a bunch, as heretofore, it is received upon the traveling-surface of the swather D, with the stems or stalks parallel with each other, and at right angles, or nearly so, to the path of the machine, and the constant movement of the apron 6 in the direction of the arrow, the successive supplies from the rakes C closely connect on the moving apron, and are deposited in a continuous swath directly in rear of said swather.

Having thus fully described my invention, I wish it to be understood that I do not desire to claim, broadly, a surface-moving table or platform, irrespectively of the combined arrangement of the same in relation to the harvester; nor do I desire to claim the platform B and moving rakes C, as these have been used before for throwing the cut grain off in bunches upon the ground; but

What I claim as my invention, and desire to secure by Letters Patent is confined to the following, viz.:

I claim the combination of the surface-moving table or traveling-canvas D, the platform B, and rake or rakes C, arranged substantially as described, so as to deliver the grain in a continuous swath in rear of the machine, with the stalks at right angles, or nearly so, to the line of the swath.

GEORGE HAMEL.

Witnesses:
BENJ. MORISON,
WM. H. MORISON.